United States Patent [19]

Kotabe

[11] Patent Number: 5,083,142
[45] Date of Patent: Jan. 21, 1992

[54] SEQUENCE CONTROLLER

[75] Inventor: Hiroaki Kotabe, Funabashi, Japan

[73] Assignee: Ricoh Company, Ltd., Tokyo, Japan

[21] Appl. No.: 556,742

[22] Filed: Jul. 23, 1990

[30] Foreign Application Priority Data

Jul. 26, 1989 [JP] Japan .................................. 1-191371

[51] Int. Cl.⁵ ..................... G01D 15/24; G03G 21/00; G06F 15/00
[52] U.S. Cl. .................................. 346/134; 355/311; 355/314; 395/100
[58] Field of Search ................ 346/134; 355/208, 311, 355/313, 314, 316, 321; 364/518

[56] References Cited

U.S. PATENT DOCUMENTS

| | | | |
|---|---|---|---|
| 4,530,063 | 7/1985 | Masuda et al. | 355/14 R |
| 4,809,050 | 2/1989 | Ito | 355/243 |
| 4,814,824 | 3/1989 | Ito et al. | 355/200 |
| 4,857,957 | 8/1989 | Kusumoto | 355/314 |
| 4,928,150 | 5/1990 | Hatta | 355/311 |
| 4,985,736 | 1/1991 | Kawano et al. | 355/311 |
| 4,992,827 | 2/1991 | Kobayashi et al. | 355/202 |
| 5,006,904 | 4/1991 | Matsuo et al. | 355/208 |

Primary Examiner—George H. Miller, Jr.
Attorney, Agent, or Firm—Cooper & Dunham

[57] ABSTRACT

A sequence controller controls an image forming apparatus which includes a plurality of paper supply paths, a plurality of paper eject paths, an image forming device, and abnormally informing devices for informing an abnormity in the paper supply and eject paths. The sequence controller includes a memory device for storing at least image forming information related to a plurality of pages, the image forming information including image data related to images to be formed and paper path information for selecting one paper supply path and one paper eject path out of the plurality of paper supply and eject paths, and a control device for controlling an image forming operation of the image forming apparatus so as to form an image using the selected paper supply and eject paths which are selected by the paper path information. The control device has a function of automatically changing at least the paper path information related to an arbitrary one of the pages, in response to an abnormity in at least one of the selected paper supply and eject paths informed by the abnormity informing device.

5 Claims, 11 Drawing Sheets

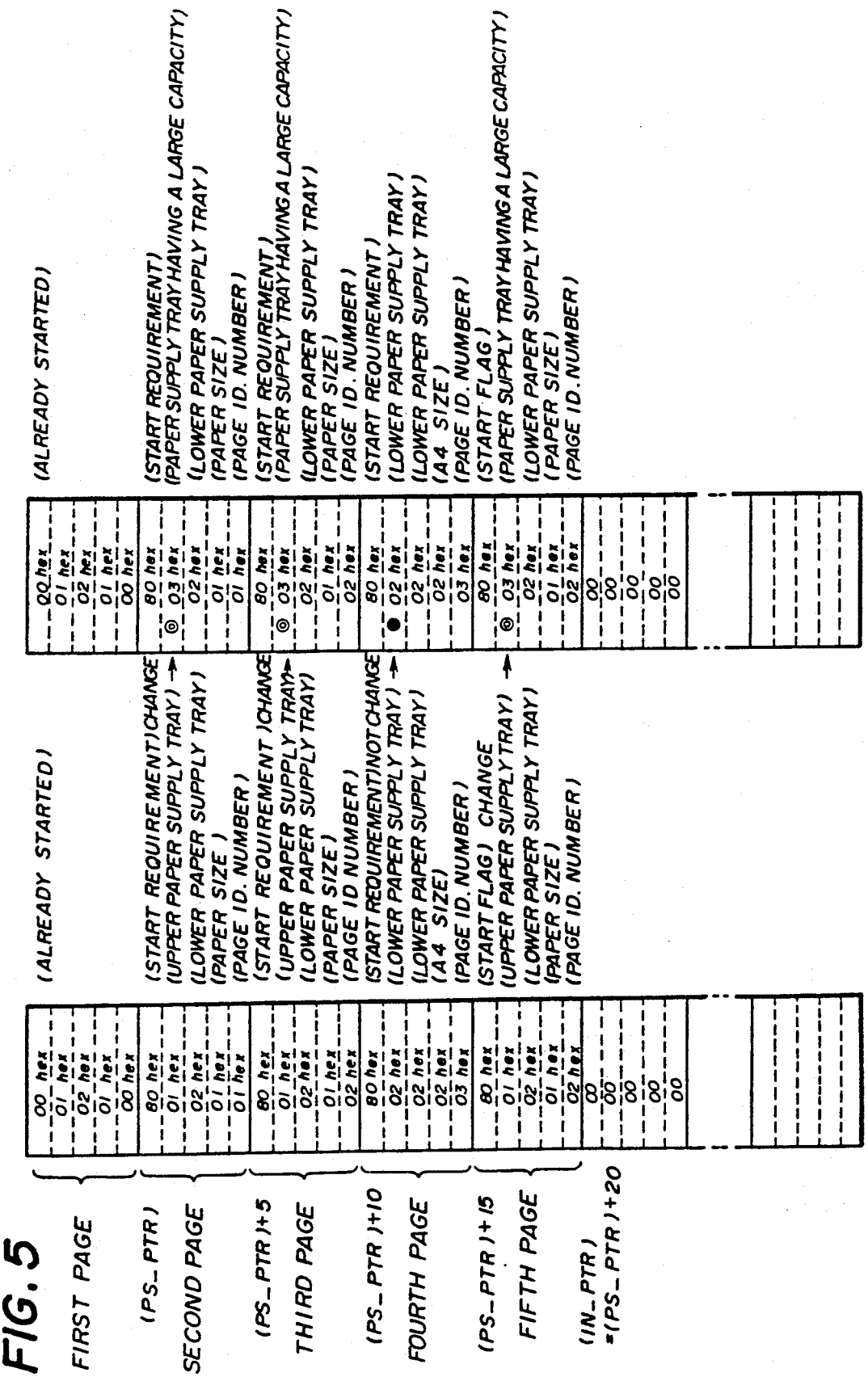

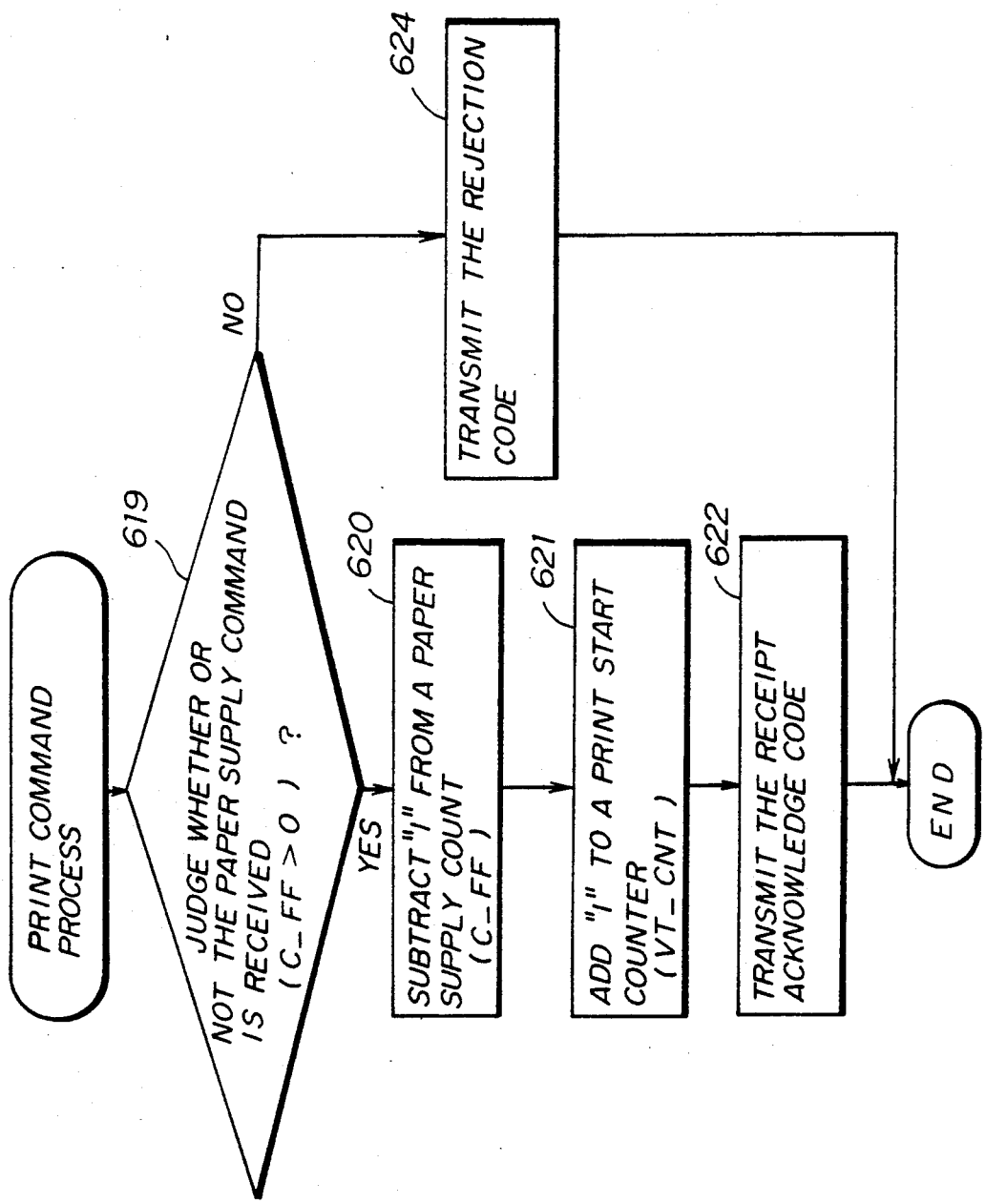

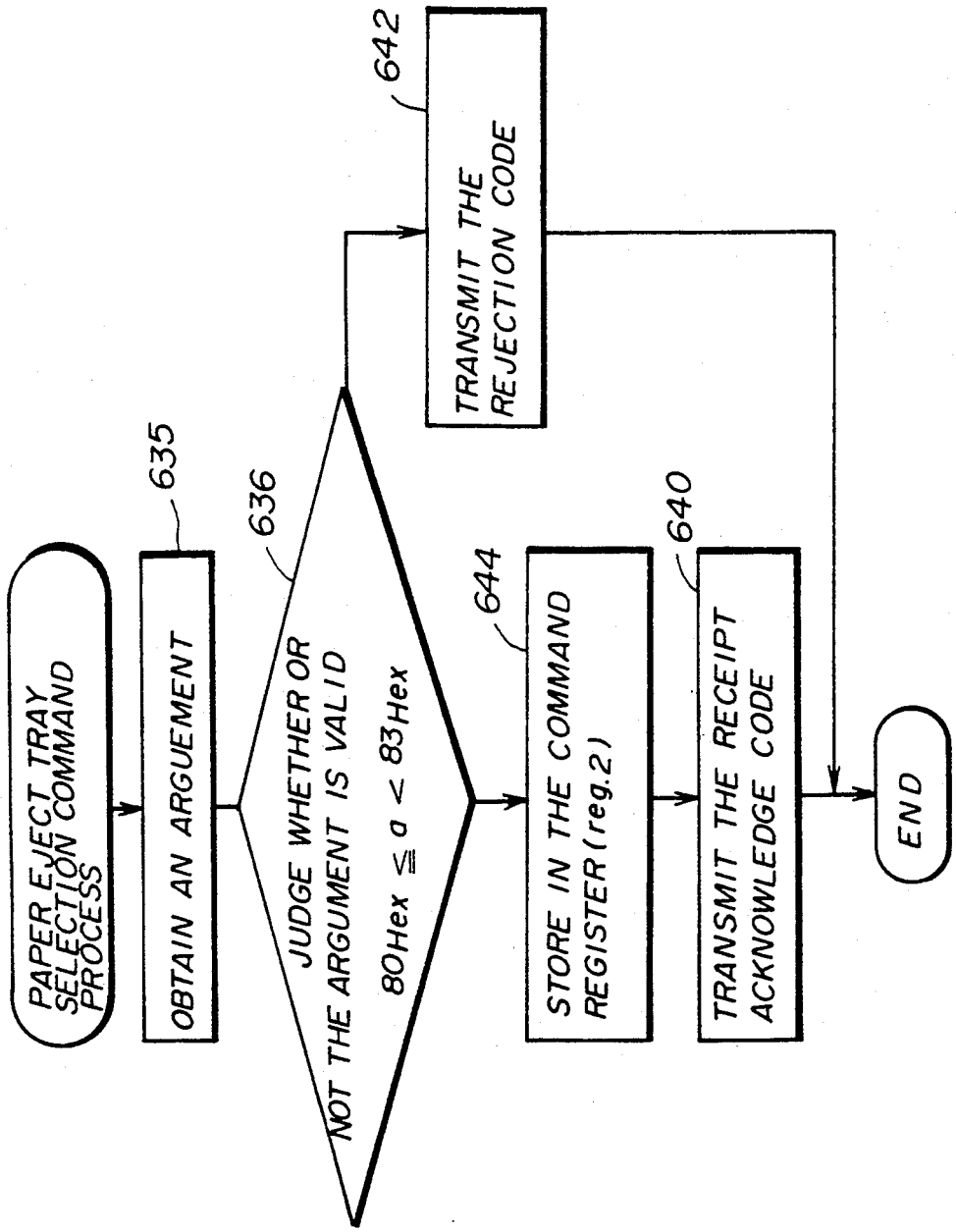

SEQUENCE CONTROLLER

BACKGROUND OF THE INVENTION

The present invention relates generally to sequence controllers of image forming apparatuses which are used as terminals of a host computer, and more particularly to a sequence controller which is set up between a host computer and an image forming apparatus such as a laser printer and stores time-sequential commands from the host computer. The commands include complex path selection commands and a print start command, and the sequence controller can change the stored commands if needed.

A conventional printer is designed to prohibit acceptance of a next print start command during a predetermined time while the printer carries out a print operation responsive to a previous print start command.

A description will be given of an operation of the conventional printer with reference to FIGS. 1 and 2. First, as shown in FIG. 1, a recording paper is supplied from one of an upper paper supply tray 1, a lower paper supply tray 2 and a paper supply tray 3 having a large capacity 3 by a corresponding one of paper supply rollers 4, 5 and 6. Resist rollers 7 control a transport timing of the recording paper and transports the recording paper to a photoconductive drum 8. The photoconductive drum 8 rotates clockwise and a surface thereof is charged by a charger 9. A laser writing unit 10 modulates an image signal into a light beam. A light beam L from the laser writing unit 10 is irradiated on the surface of the photoconductive drum 8 thereby forming an electrostatic image on the surface of the photoconductive drum 8.

The electrostatic image is visualized into a toner image by a developer 11 which forms a toner layer. A transfer charger 12 transfers the toner image onto the recording paper which is transported to the photoconductive drum 8. The recording paper is further transported to a fixing unit 14 by a transport belt 13, and the toner image is fixed on the recording paper. After passing the fixing unit 14, the recording paper is ejected to one of a lower eject tray 17, an upper eject tray 18, a side eject tray 19 and a duplex unit 20 via path selectors 15 and 16. After the transfer of the toner image, the photoconductive drum 8 is cleaned by removing residual toner by a cleaning unit 21.

The printer is coupled to a sequence controller 23 and the sequence controller 23 is coupled to an image data processor 22. The image data processor 22 is coupled, on the other hand, to a host system 24 such as a computer and a word processor. The image data processor 22 converts print data codes into laser modulating data. The sequence controller 23 controls the operation sequence of the printer. The image data processor 22 and the sequence controller 23 are located at an upper part of a main printer body.

FIG. 2 generally shows the image data processor 22 and the sequence controller 23. In FIG. 2, the image data processor 22 converts image data received from the host system 24 into the laser modulating data and selection signals for selecting paper supply paths, paper eject paths and print modes such as a one-sided mode, a two-sided mode. The sequence controller 23 controls the printing operation of the printer 25 in response to a print request signal from the image data processor 22.

Said sequence controller 23 comprises a serial input and output interface 230, a parallel input and output interface 231, a central processing unit (CPU) 232, a read only memory (ROM) 233, and a random access memory (RAM) 234 which are coupled to each other via a bus 235. The serial input and output interface 230 is coupled to the image data processor 22. The parallel input and output interface 231 is coupled to the printer 25. The CPU 232 carries out a general control and controls the entire operation of the sequence controller 23. The ROM 233 stores programs for controlling the CPU 232. The laser modulating data and the selection signals from the image data processor 22 are stored in the RAM 234.

The printer 25 further comprises an operation and display part (not shown) including keys for inputting various instructions and a display for displaying various messages.

A description will now be given on the operation of the system shown in FIG. 2. When all print data related to a print start command from the host system 24 are received at the image data processor 24, the image data processor 24 supplies to the sequence controller 23 the selection signals for selecting paper supply paths, paper eject paths, print modes and the like. And when the sequence controller 23 receives a print start signal, the CPU 232 starts a print sequence control.

As for command transmission, command codes are transmitted from the image data processor 22 to the sequence controller 23 by a serial communication method, while the commands are transmitted from the sequence controller 23 to various parts of the printer 25 by a parallel communication method.

The printer 25 is designed to prohibit acceptance of a next print start command during a predetermined time while the printer carries out a print operation responsive to a previous print start command. Consequently, the image data processor 22 must postpone generation of the print start command until the printer 25 is ready for the next print operation even if all the necessary print data are received at the image data processor 24. This is a barrier to improvement of the processing speed.

To solve this problem, it is conceivable to make the sequence controller 23 accept the next print start command before the printer 25 assumes a ready state in which the next print operation can be carried out, and successively store the related selection information such as the paper supply and eject paths in the RAM 234. In this case, the printer 25 carries out a print operation in accordance with the selection information stored in the RAM 234 whenever the printer 25 assumes the ready state. But even in this case, when a problem occurs in the selected paper supply and eject paths, such as the case where paper runs out when the print operation is to be carried out, the CPU 232 stops the print operation in response to a detection signal from the printer 25. In order to restore the printer to the ready state, an operator manually removes the problem. In above described case, the operator must carry out the troublesome operation of setting a sufficient supply of paper in the concerned paper supply tray.

SUMMARY OF THE INVENTION

Accordingly, it is a general object of the present invention to provide a novel and useful sequence controller in which the problems described above are eliminated.

Another and more specific object of the present invention is to provide a sequence controller which controls an image forming apparatus which includes a plurality of paper supply paths, a plurality of paper eject paths, image forming means, and abnormity informing means for informing an abnormity in the paper supply and eject paths, which sequence controller comprises memory means for storing at least image forming information related to a plurality of pages, the image forming information related to each page including image data related to images to be formed by the image forming means and paper path information for selecting one paper supply path and one paper eject path out of the plurality of paper supply and eject paths, and control means coupled to the memory means for controlling an image forming operation of the image forming apparatus so as to form an image described by the image information on a recording paper using the selected paper supply and eject paths which are selected by the paper path information which are stored in said memory means, where the control means includes means for automatically changing at least the paper path information related to an arbitrary one of the pages, in response to an abnormity informed in at least one of the selected paper supply and eject paths informed by the abnormity informing means.

According to the sequence controller of the present invention, it is possible to automatically change the image forming information, that is, the paper supply and/or eject paths, when an abnormity occurs in the selected paper supply and/or eject paths. As a result, it is possible to improve the processing speed of the sequence controller regardless of the abnormity.

Other object and further features of the present invention will be apparent from the following detailed description when read in conjunction with the accompanying drawings.

BRIEF DESCRIPTION OF THE DRAWINGS

FIG. 5 is a diagram for explaining a process of changing a paper supply change command of a command buffer; and FIG. 6A through 6F are flowcharts for explaining operations of a CPU shown in FIG. 3.

DESCRIPTION OF THE PREFERRED EMBODIMENTS

Figure 2:
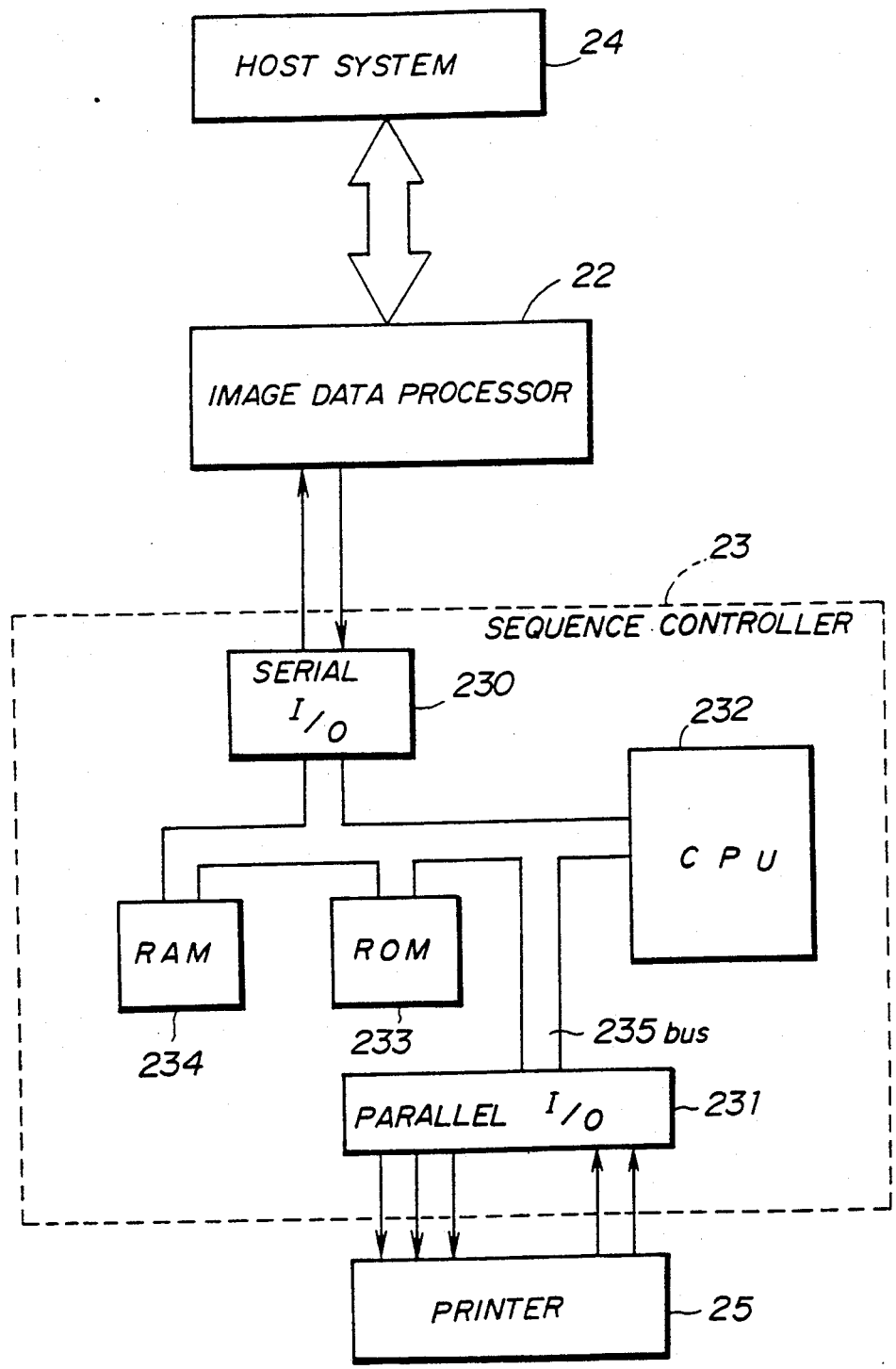
FIG. 2 is a system block diagram showing conventional image data processor and sequence controller.
Figure 3:
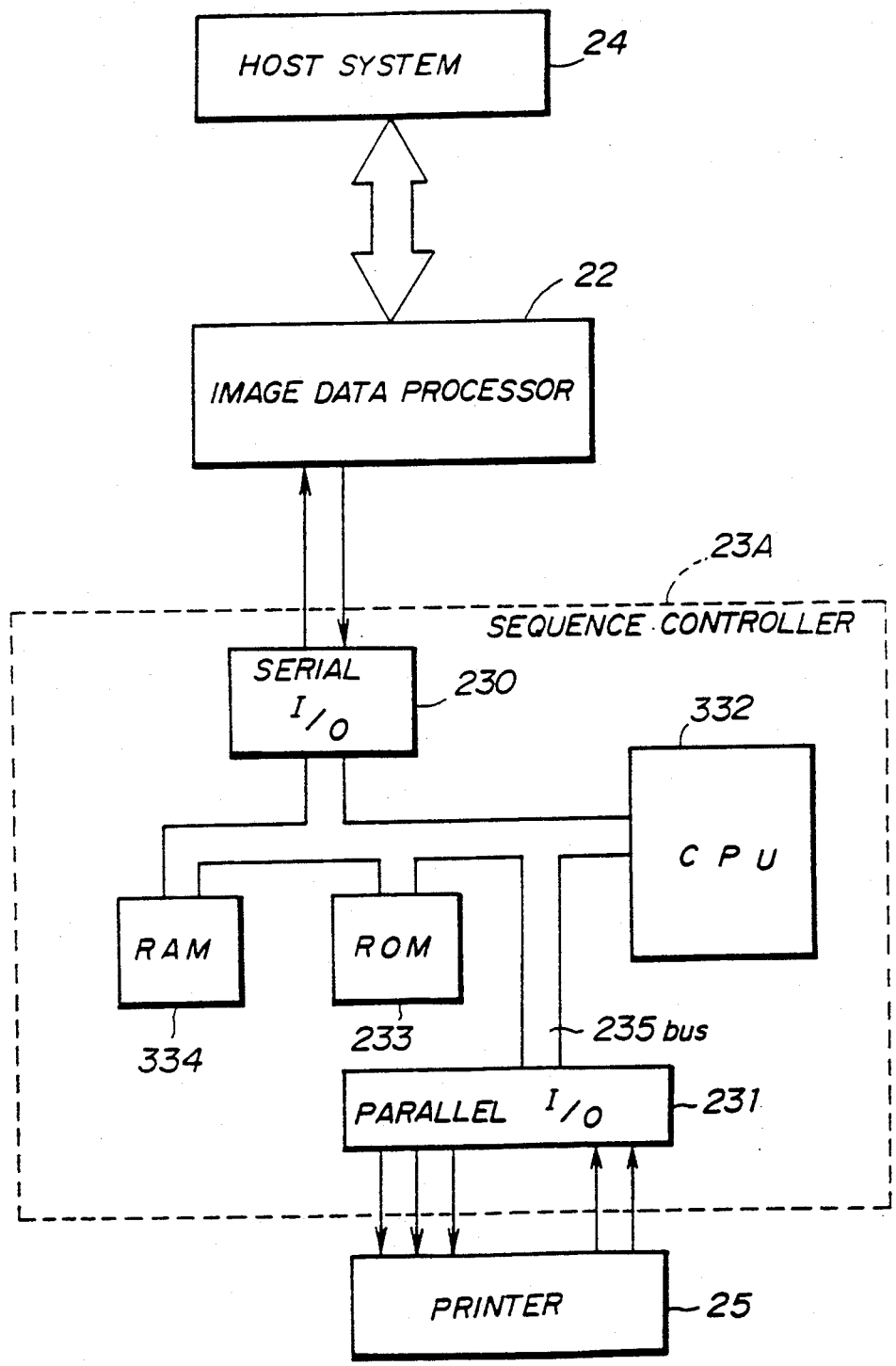
FIG. 3 is a system block diagram showing an essential part of an embodiment of sequence controller according to the present invention.

FIG. 3 shows an essential part of an embodiment of sequence controller according to the present invention. In this embodiment, the present invention is applied to a laser printer such as that shown in FIG. 1. In FIG. 3, those parts which are the same as those corresponding parts in FIG. 2 are designated by the same reference numerals, and a description thereof will be omitted.

In this embodiment, a print start command and a plurality of path selection commands intended for the printer 25 are stored and changed in a sequence controller 23A.

A description will now be given on the command format. The print start command comprises a paper supply start command and a print start command. The paper supply start command instructs the supply of paper from a selected paper supply path to a synchronizing means which synchronizes a tip end of an image, that is, to the resist rollers 7 described above with reference to FIG. 1. "FF" of the ASCII code is assigned to the paper supply start command. The print start command instructs the start of an image formation, that is, the start of charge, exposure, developing, transfer and fixing processes described above with reference to FIG. 1. "VT" of the ASCII code is assigned to the print start command. A description will now be given on the operation of the sequence controller 23A with reference to FIGS. 3 and 4. When selection codes related to the paper supply path, paper eject path and print mode are supplied from the image data processor 22 to the serial input and output 230, the sequence controller 23A stores these selection codes in a command register region 334A of a RAM 334 via the buses 235. A paper supply selection code is stored in an area reg. 1, a paper eject selection code is stored in an area reg. 2, and a print mode selection code is stored in an area reg. 0. In the case of a paper supply path selection code, a paper size set for the selected paper supply path is stored in an area reg. 3. The store process described above made whenever each selection code is received, and consequently, the areas reg. 0 through reg. 3 store only the latest selection codes.

The process of storing the selection signals is controlled by a CPU 332. The operation of the CPU 332 will be described later with reference to FIGS. 6D through 6F. When the sequence controller 23A receives the selection codes, the CPU 332 supplies commands corresponding to the received selection codes.

These selection codes are respectively made up of 2 bytes. A first byte of the selection code indicates the kind of command (hereinafter referred to as "operand"), and a most significant bit (MSB) of the first byte is "0". A second byte of the selection code indicates the content of the selection (hereinafter referred to as "argument"), and a MSB of the second byte is "1". The above areas reg. 1 through reg. 3 are respectively made up of 1 byte, and the MSB of the argument is "0". The sequence controller 23A returns a value stored in each of the areas reg. 0 through reg. 3 to the image data processor 22 in response to the selection command.

The following shows the correspondence of the operands and the arguments of designated commands stored in each of the areas reg. 0 through reg. 2.

① Paper supply path designation code
Operand: ASCII 'I' (49 hex)
Argument: 81 hex area reg. 1=01 hex when upper paper supply path is selected.
82 hex area reg. 1=02 hex when lower paper supply path is selected.

② Paper eject path designation code
Operand: ASCII 'O' (4 Fhex)
Argument: 81 hex area reg. 2=01 hex when upper paper eject path is selected.
82 hex area reg. 2=02 hex when lower paper eject path is selected.
83 hex area reg. 2=03 hex when side paper eject path is selected.

③ Print mode designation code
Operand: ASCII 'T' (54 hex)

Argument: 80 hex area reg. 0=00 hex when making one-sided print.
  81 hex area reg. 0=01 hex when making two-sided print 1.
  82 hex area reg. 0=02 hex when making two-sided print 2.

Next, a description will be given in detail on the operation of the CPU 332 with reference to the FIG. 6A. When codes are supplied to the sequence controller 23A from the image data processor 22, the CPU 332 starts a command process shown in FIG. 6A. First, a step 601 judges whether or not a paper supply path change command is received. If the step 601 judges NO, then a step 602 judges whether or not a paper supply command is received. If the step 602 judges NO, then a step 603 judges whether or not a print command is received. If the step 603 judges NO, then a step 604 judges whether or not a paper supply tray selection command is received. If the step 604 judges NO, then a step 605 judges whether or not a paper eject tray selection command is received. If the step 605 judges NO, then a step 606 judges whether or not a print modes selection command is received. If the step 606 judges NO, a step 607 transmits a rejection code to the image data processor 22 and the command process ends.

Figure 4:
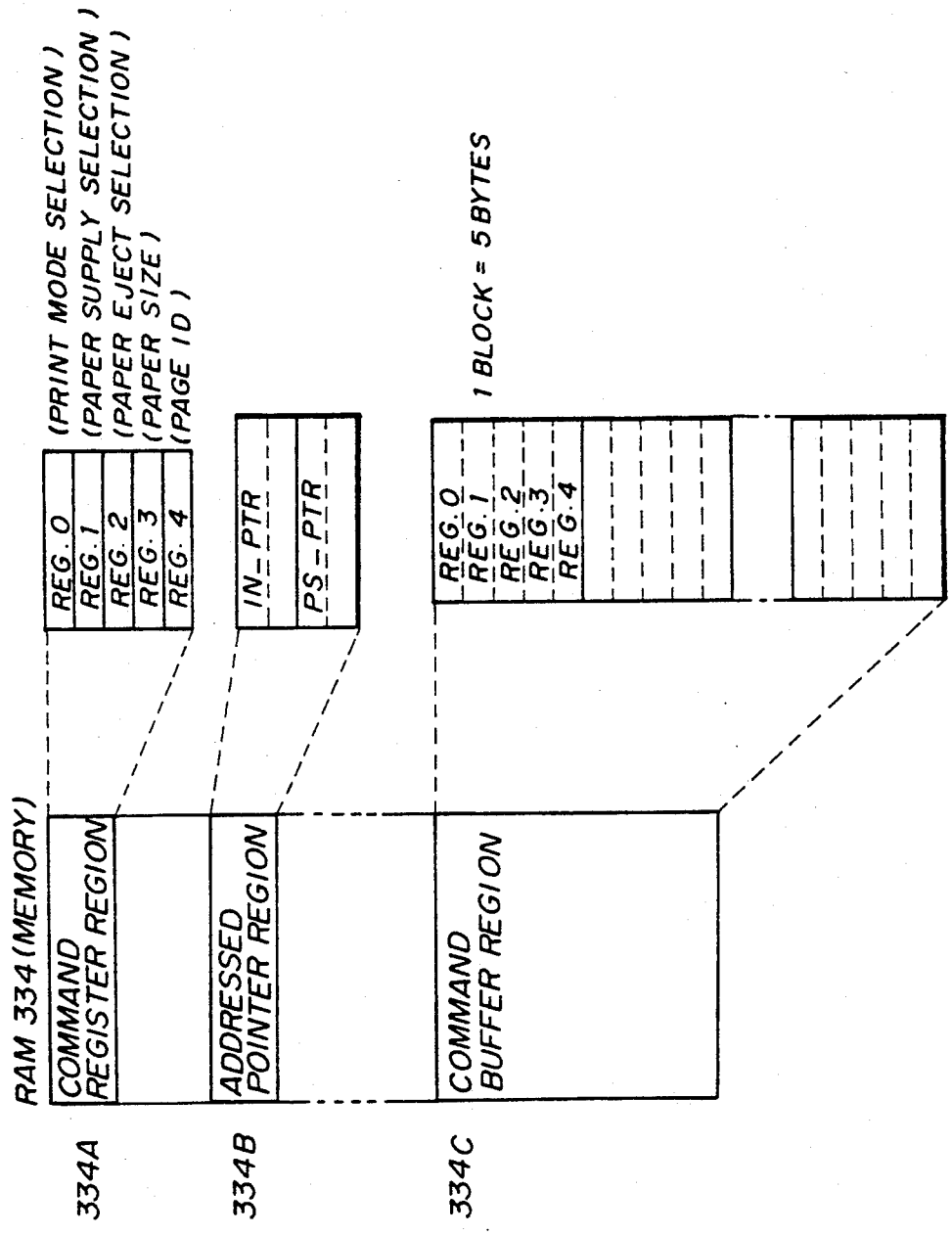
FIG. 4 is a diagram showing storage areas of a RAM shown in FIG. 3.

When the sequence controller 23A receives the paper supply start code ("FF"), the CPU 332 makes a bit 7 of the area reg. 0 "1", and stores the contents of the areas reg. 0 through reg. 4 in the form of a single block into another region of the RAM 334, that is, a command buffer region 334C of the RAM 334 shown in FIG. 4. In this case, the step 602 judges YES and a step 609 stores the contents of the command register region 334A, that is, the paper supply start code ("FF"), into the command buffer region 334C. The command buffer region 334C has a memory capacity sufficient to store 16 blocks of the contents of the areas reg. 0 through reg. 4 (5 bytes), and a stored address is indicated by a stored address pointer IN-PTR in an address pointer region 334B shown in FIG. 4. After the paper supply start code ("FF") is stored in the command buffer region 334C, a step 610 adds "1" to the stored address pointer IN-PTR to indicate the next block. The step 611 adds "1" to a paper supply start command count C-FF. "1" is subtracted from the paper supply start command count C-FF when the sequence controller 23A receives the print start command ("VT"). A step 612 returns a page ID number which is stored at the area reg. 4 as a receipt acknowledge to the image data processor 22.

A step 613 counts up the page ID number after it is returned, and the command process ends.

The sequence controller 23A makes the printer 25 start the print operation when the printer 25 assumes the ready state and the print start command (in which the bit 7 of the first byte is 1) is stored at the address specified by the print start pointer PS-PTR in the address pointer region 334B. Then a print sequence is performed with a predetermined timing according to a value of a software counter as described hereunder in conjunction with FIG. 6B. When the step 603 shown in FIG. 6A judges YES, a print command process shown in FIG. 6B is carried out. As shown in FIG. 6B, a step 619 judges whether or not the paper supply command is received. If the step 619 judges NO, a step 624 transmits the rejection code. But if the step 619 judges YES, a step 620 subtracts "1" from a paper supply count, and a step 621 adds "1" to a print start count. A step 622 transmits a receipt acknowledge code to the image data processor 22. The print command process ends after the step 624 or 622.

Figure 1:
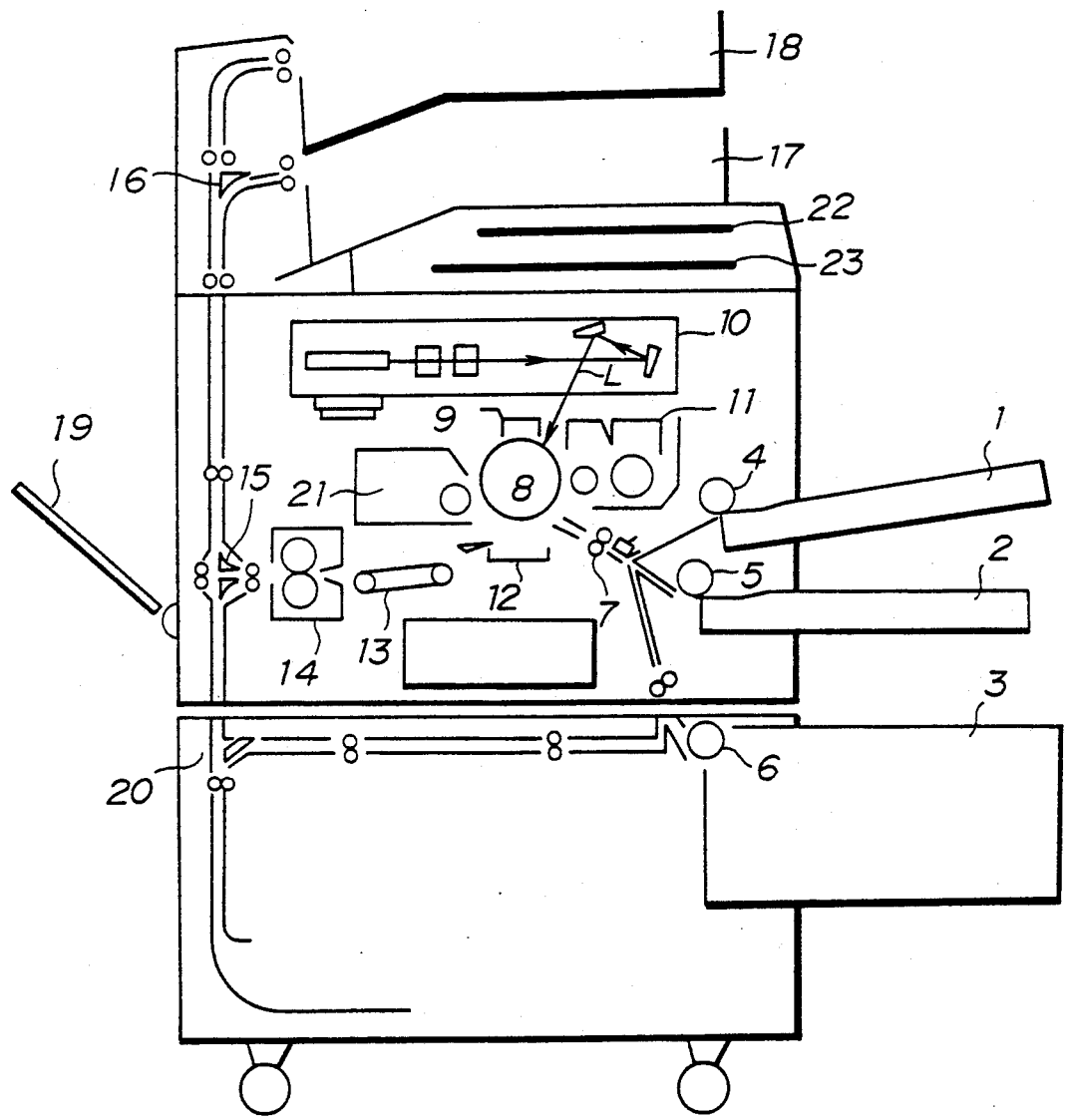
FIG. 1 is a side view in cross section showing a laser printer.

The recording paper is selected from among the upper paper supply tray 1, the lower paper supply tray 2, and the paper supply tray 3 having a large capacity as shown in FIG. 1, and is then supplied by the corresponding one of the paper supply rollers 4, 5, and 6 to the resist rollers 7 with a predetermined timing. The recording paper is temporarily stopped at the resist rollers 7, when the print start command (VT-CNT>0) is received, then "1" is subtracted from VT-CNT. The surface of the photoconductive drum 8 which is charged by the charger 9 is exposed to form an electrostatic image by irradiating a laser beam which makes a main along an axis of the photoconductive drum 8 after intensity of the laser writing unit 10 is preset with predetermined timing. The laser beam is modulated depending on the image data by the laser writing unit 10. Next, the electrostatic image is developed into a toner image by the toner from the developer 11, and the toner image is transferred onto the recording paper which supplies by the resist rollers 7 with a predetermined timing by the transfer charger 12. Finally, the recording paper is separated from the photoconductive drum 8 and transported to the fixing unit 14 via the transport belt 13 to be thermally fixed. Then, the recording paper is transported to the selected one of the paper eject trays 17, 18 and 19 and the like, via one of the path selectors 15 and 16.

The present invention uses the following paper supply path change command as a command which changes each paper supply path selection code, and this paper supply change command is located between a block addressed by the print start pointer PS-PTR and a block addressed by the stored address pointer IN-PTR.

Operand: ASCII 'i' (69 hex).
Argument: 81 hex select upper paper supply path.
  82 hex select lower paper supply path.
  83 hex select tray 3 having the large capacity.

Figure 6A:
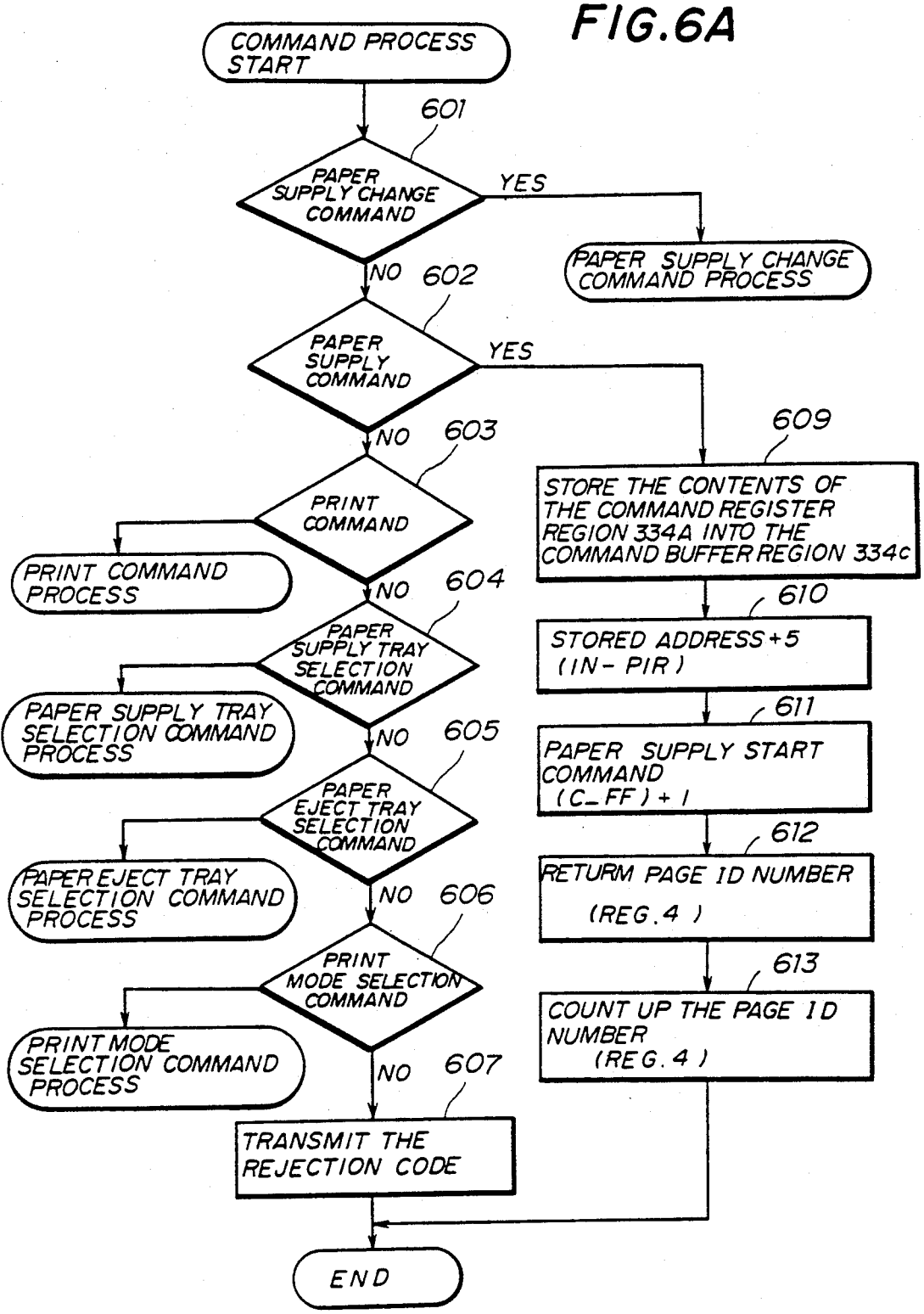
Figure 6C:
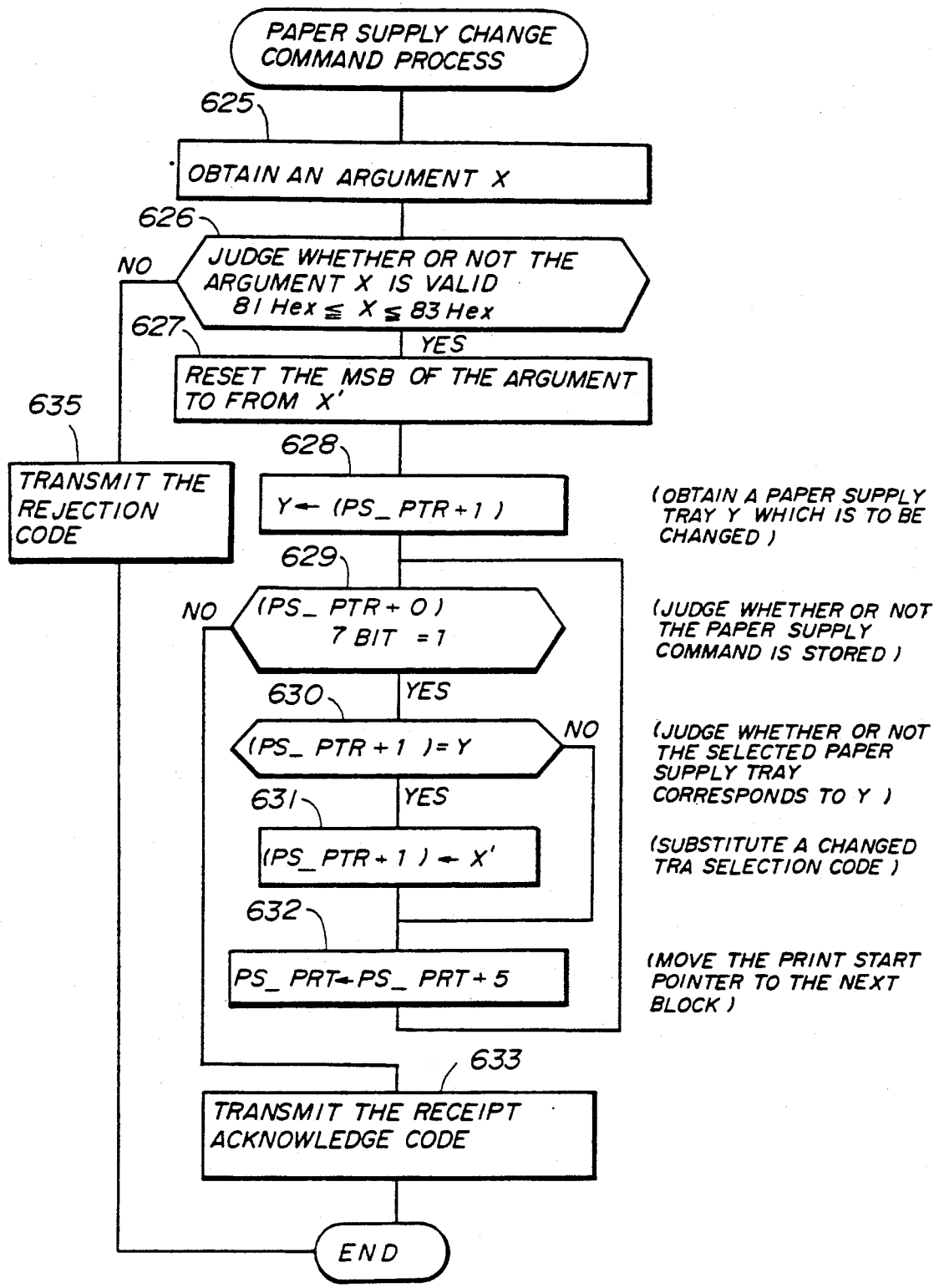

When the sequence controller 23A receives the paper supply path change command and the step 601 shown in FIG. 6A judges YES, a paper supply path change command process shown in FIG. 6C starts. As shown in FIG. 6C, when a step 625 obtains an argument X of the paper supply path designation code, a step 626 judges whether or not the argument is valid comparing with the predetermined values, that is 81 Hex≦X≦83 Hex. If the step 626 judges NO, the step 635 transmits the rejection code as mentioned above. But when the step 626 judges YES, a step 627 resets the MSB of the argument X to form X'. A step 628 obtains a paper supply tray code Y which is to be changed at the address specified by the print start pointer PS-PTR+1. Then, a step 629 judges whether or not the paper supply command is stored, that is, whether or not the bit 7 of the print start pointer PS-PTR+0 is "1". If the step 629 judges NO, a step 633 transmits the receipt acknowledge code. But if the step 629 judges YES, a step 630 judges whether or not the paper supply command specified by the print start pointer PS-PTR+1 has the same paper supply tray code Y. If the step 630 judges NO, a step 632 moves the print start pointer to the next block. But when the step 630 judges YES, a step 631 substitutes X' into the location specified by the print start pointer PS-PTR+1. After the step 632, the process returns to the step 629. Thus, the CPU 332 changes the paper supply path designation code which corresponds to that of the print start pointer PS-PTR into the paper supply path designation code designated by the argument.

FIG. 5 shows the course of the change in the command buffer region 334C which receives the paper supply path change command i+83 (which changes the tray desognation into the paper supply tray 3 having the large capacity shown in FIG. 1). The state before receipt of the command i+83 is (1) indicated under and the state after receipt of the command i+83 is indicated under (2). The first page is already printed (the first byte is 0), and the start of printing the second and subsequent is waited (the first byte of each block is 80 hex).

First, the path from the upper paper wupply tray 1 to the lower paper eject tray 17 is designated as the path for the second page. The path for the third page is designated similarly. The path from the lower paper supply tray 2 to the lower paper eject tray 17 is designated as the path for the fourth page. The path for the fifth page is designated similarly to the second page. When the paper supply path change command is received in this state, the block in which the print information of the second page is stored is addressed by the print start pointer PS-PTR. Since this block designates the upper paper supply tray 1, among subsequent blocks, those blocks which select the upper paper supply tray 1 are changed. This change continues until one block before the block which is addressed by the stored address pointer IN-PTR. Consequently, the state changes from (1) to (2) in FIG. 5.

Figure 6D:
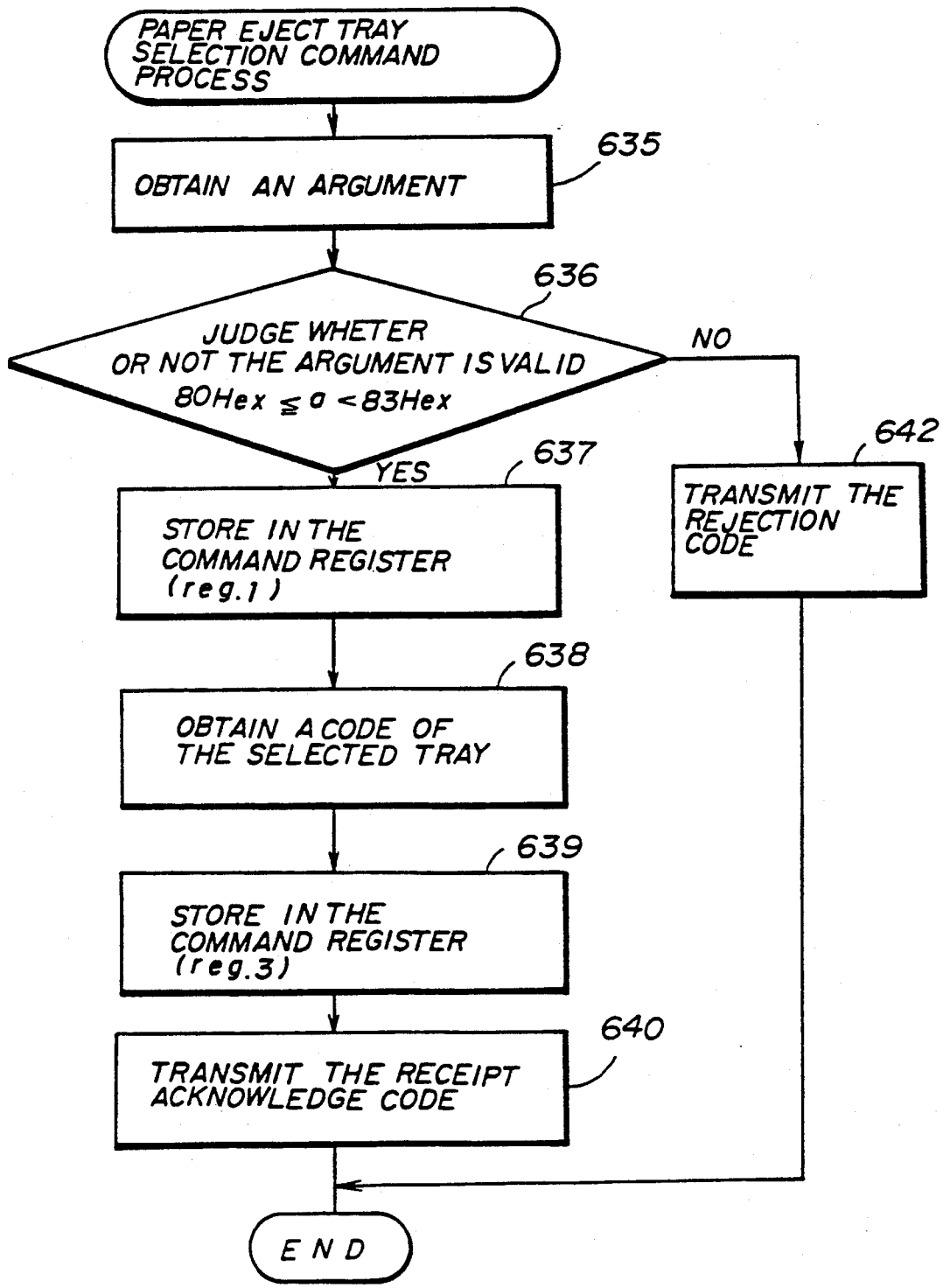

A description will now be given on the paper supply tray selection command, paper eject tray selection command and print mode selection command processes with reference to FIGS. 6D, 6E and 6F.

First, the paper supply tray selection command process will be described. When the step 604 shown in FIG. 6A, judges YES, the paper supply tray selection command process shown in FIG. 6D starts. A step 635 obtains an argument, and a step 636 judges whether or not the argument is valid. If the step 636 judges NO, a step 642 transmits the rejection code. But if the step 636 judges YES, then a step 637 stores the argument in the area reg. 1 of the command register region 334A. Next, a step 638 obtains the tray code of the selected tray, and a step 639 stores the tray code in the area reg. 3. A step 640 transmits the receipt acknowledge code.

As shown in FIG. 6E, the eject tray selection command process is similar to the paper supply tray selection command process. In FIG. 6E, those steps which are essentially the same as those corresponding steps in FIG. 6D are designated by the same reference numerals, and a description thereof will be omitted. Therefore, when a step 642 obtains the argument, a step 643 judges its validness. If the step 643 judges YES, a step 644 stores the argument in the area reg. 2.

Figure 6F:
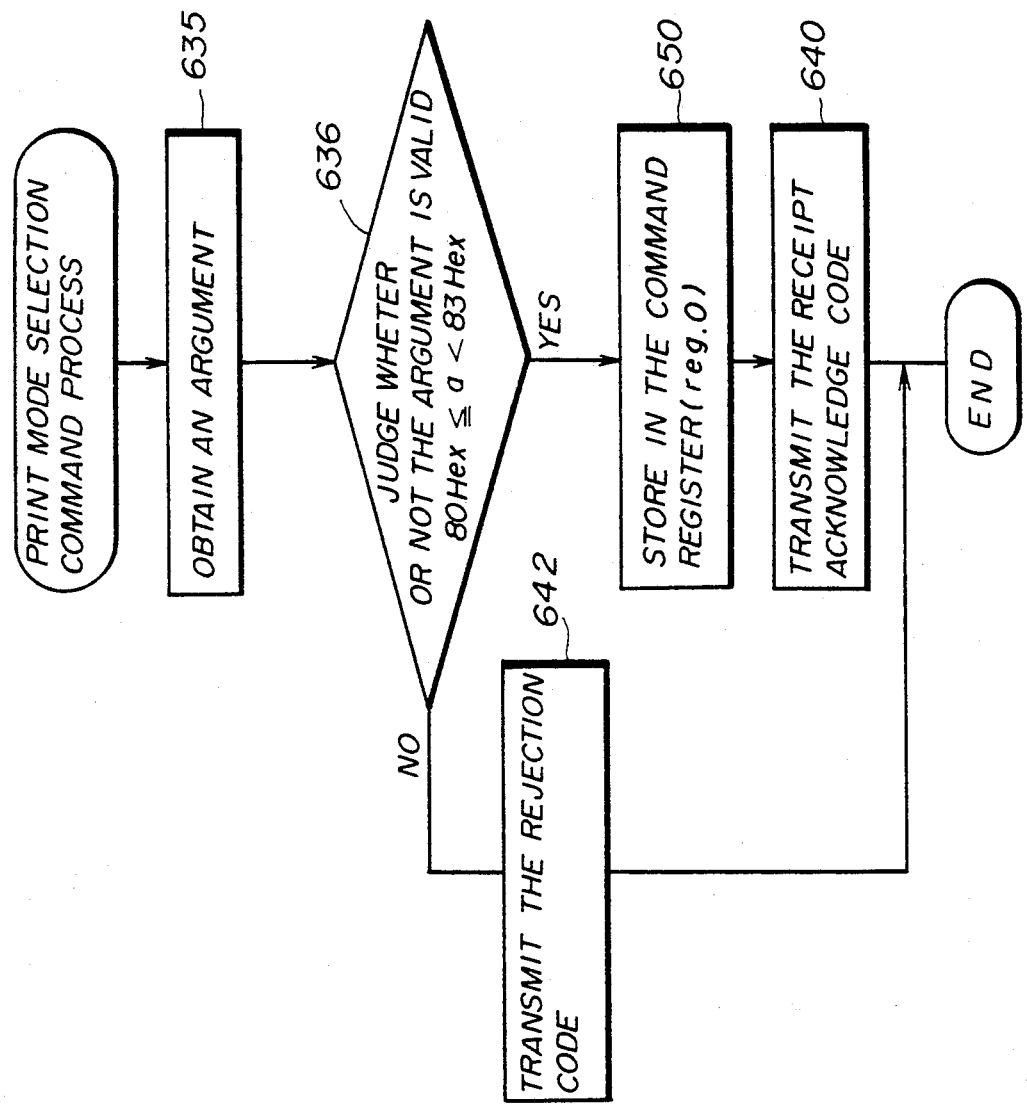

As shown in FIG. 6F, the print modes selection command process is quite similar to the eject tray selection command. In FIG. 6F, those steps which are essentially the same as those corresponding steps in FIG. 6D are designated by the same reference numerals, and a description thereof will be omitted. The process in FIG. 6F differs from the process in FIG. 6D in that a step 650 stores the valid argument in the area reg. 0.

In this embodiment, the present invention is applied to a printer, however, the present invention may be applied to other image forming apparatuses such as a facsimile machine and a copying machine.

Further, the present invention is not limited to these embodiments, but various variations and modifications may be made without departing from the scope of the present invention.

What is claimed is:

1. A sequence controller which controls an image forming apparatus which includes a plurality of paper supply paths, a plurality of paper eject paths, image forming means, and abnormity informing means for informing an abnormity in the paper supply and eject paths, said sequence controller comprising:

memory means for storing at least image forming information related to a plurality of pages, said image forming information related to each page including image data related to images to be formed by the image forming means and paper path information for selecting one paper supply path and one paper eject path out of the plurality of paper supply and eject paths related to one of the pages; and control means coupled to said memory means for controlling an image forming operation of the image forming apparatus so as to form an image described by the image information on a recording paper using the selected paper supply and eject paths which are selected by the paper path information which are stored in said memory means;

said control means including means for automatically changing at least the paper path information related to an arbitrary one of the pages, in response to an abnormity in at least one of the selected paper supply and eject paths informed by the abnormity informing means.

2. The sequence controller according to claim 1, wherein the image forming information of said memory means further includes print mode information which designates a print mode of the image forming apparatus.

3. The sequence controller according to claim 1, wherein the image forming information further includes paper size information which designates a size of the recording paper.

4. The sequence controller according to claim 1, wherein the image forming information further includes page identification information which designates the identification of the recording paper.

5. The sequence controller according to claim 1, wherein said memory means comprises a plurality of areas provided in correspondence with each kind of image forming information, and each kind of image forming information is made up of a code comprising a first part indicating the kind of image forming information and a second part indicating a content of the image forming information.

* * * * *